Dec. 31, 1940.  E. FITZNER  2,226,759
POWER VEHICLE
Filed Feb. 17, 1939
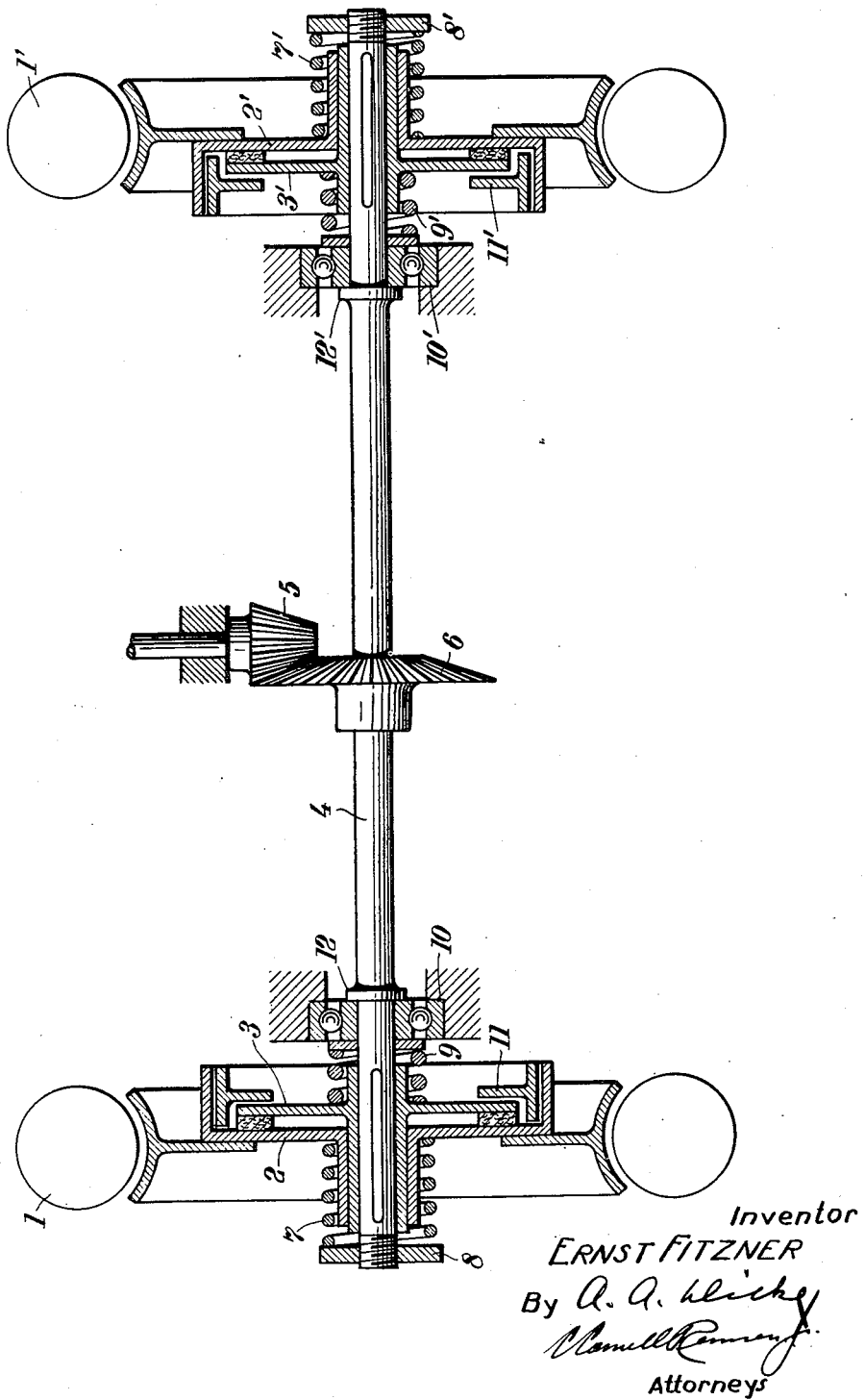
Inventor
ERNST FITZNER
By
Attorneys Patented Dec. 31, 1940

2,226,759

UNITED STATES PATENT OFFICE 2,226,759

POWER VEHICLE

Ernst Fitzner, Stuttgart-Wangen, Germany, assignor to Dr. Ing. h. c. F. Porsche, K.-G., Stuttgart-Zuffenhausen, Germany, a company of Germany Application February 17, 1939, Serial No. 256,865
In Germany February 19, 1938

6 Claims. (Cl. 180—76)

This invention relates to power vehicles and more particularly to an arrangement for driving the wheels of a vehicle without the use of differential gearing.

An object of this invention is to provide improved simplified means for driving the wheels of a vehicle.

Another object of this invention is to provide an arrangement for driving the wheels of a vehicle without the use of differential gearing, while at the same time preventing sliding of the wheels relative to the road surface when rounding a curve.

Still another object of this invention is providing a novel arrangement for driving the wheels of a vehicle without the use of a differential gearing, wherein the inner driving wheel is disengaged when the vehicle traverses a curve.

A further object of this invention is the provision of an arrangement for driving the wheels of a vehicle without the use of a differential gearing, through a friction coupling for each wheel.

A more specific object of this invention is the provision of an arrangement for driving the wheels of a vehicle without the use of a differential gearing, through a friction coupling for each wheel, which is disengaged to free the inner wheel when the vehicle traverses a curve.

With these and incidental objects in view, the invention consists in certain novel features of construction and combination of parts which are set forth in the appended claims and a preferred embodiment whereof is hereafter described with reference to the drawing which accompanies and forms part of the specification, wherein:

The single figure illustrates a preferred embodiment of a wheel driving mechanism formed in accordance with the principles of this invention.

According to the drawing, the driving wheels on opposite sides of the vehicle have been indicated by the reference numerals 1, 1'. These are preferably rigidly interconnected with respective hollow brake drums 2, 2' which are also adapted to form a half of a friction coupling for driving the wheel. The other half of the coupling is formed by discs 3, 3' which are attached for rotation with the drive shaft 4. The discs are longitudinally slidable along the drive shaft 4, while the brake drums 2, 2' may be rotatably mounted upon annular extensions of the respective discs. The drive shaft 4 is adapted to be interconnected to the source of power (not shown) through bevel gears 5 and 6.

The brake drums 2 and 2' are pressed inwardly by respective springs 7 and 7' which abut against collars or equivalent means 8, 8' rigidly attached to the ends of the shaft 4. Springs 9 and 9', on the other hand, act to press the discs 3, 3' outwardly against the brake drums 2, 2' and these springs may react against the frame or, as shown, against the ball bearings 10, 10' which serve to support the drive shaft 4 on the frame. Means such as the collars 12, 12' adjacent bearings 10, 10' are also provided on the shaft to prevent transverse motion of the drive shaft 4 relative to the vehicle frame.

As indicated above, the drums 2, 2' rigidly interconnected with the wheels 1, 1' and serving as one half of the friction couplings, may serve as brake drums. Brake shoes 11, 11' have been indicated as acting upon the inner surface of the drums, although other arrangements within the skill of those employed in this art may be utilized.

The inner springs 9, 9' are preferably of greater stiffness than the springs 7, 7'. In normal driving, however, the opposing action of the spring pairs, 7, 9 and 7', 9' will press together their respective friction couplings 2, 3 and 2', 3' so that their respective wheels 1, 1' will be drivably connected to the shaft 4 without slipping.

If the vehicle rounds a curve, however, it will be subjected to centrifugal force which will tend to move it outwardly of the curve. If, for example, the vehicle is traversing such a curve so that it will tend to move toward the left of the figure, a decreased force will act upon the coupling half 3', while an increased force will tend to press the coupling half 3 upon the engaging section of the brake drum 2. This will declutch the brake drum 2' from the driving disc 3', thus permitting the inner wheel 1' to run freely. At the same time, the connection between the coupling halves 2 and 3 will become more secure, and, also due to the centrifugal force, the wheel 1 will exert a greater pressure upon the ground and therefore be able to better transmit its increased torque. Since the wheel 1 and the shaft 4 are resiliently shiftable relative to each other through the springs 7 and 9, the wheel does not slide outwardly when the vehicle body and shaft moves in response to the centrifugal force. Since the inner wheel 1' is running freely it will exert no torque upon the outer wheel 1 and there will therefore be no sliding on the road due to the different speeds of these wheels. Accordingly, by means of this arrangement the usual differential gearing is unnecessary. It is obvious that if the vehicle traverses a curve in the opposite direction, in which case the wheel 1 will then be the inner wheel and the wheel 1' the outer wheel, exactly the opposite effect will take place. As soon as the vehicle leaves the curve, the effect of the centrifugal force disappears and the springs 7, 7', 8, 8' will return the parts to their original position, and the previously released clutch will now become re-engaged.

It will be seen that the above described construction is of great advantage in that it eliminates the expensive and complicated differential mechanism which up to the present time has been thought necessary to prevent slipping of the wheels when a vehicle is traversing a curve. By this arrangement all the power is transmitted to the outer wheel where it is needed and applicant is therefore able to take advantage of the fact that the centrifugal force acting upon the outer wheel has a vertical component which permits this wheel to better transmit the increased torque.

While the construction described and illustrated need not be followed exactly, it will be noted that it is extremely saving of space in that the entire frictional driving gearing is housed within and formed part of the vehicle brake drum structure.

While the invention has been illustrated as applicable to a vehicle with a single stiff axle, it may obviously be applied to arrangements with independently sprung driving wheels. The type of clutch or coupling is of relative unimportance and may be of the single or multiple plate form. Variations in the type of coupling actuating springs are also possible within the scope of this invention; for example, they may be flat or disc springs.

Accordingly, having described an illustrative embodiment of the invention, it is pointed out that various changes and modifications therein, other than set forth above, may be made without departing from the invention as set forth in the following claims.

I claim:

1. In a vehicle, a driving wheel, a drive shaft, and a friction coupling normally drivably connected to said driving wheel and drive shaft and responsive to centrifugal forces acting in one direction upon said vehicle for disengaging said drive wheel from said drive shaft, said friction coupling including a pair of frictionally engageable members, one of which is connected for rotation with said wheel, and the other of which is connected for rotation with and longitudinally shiftable upon said drive shaft, said other member having an extension upon which said first member is rotatably mounted.

2. In a vehicle, a hollow brake drum, a vehicle ground-engaging wheel rigidly interconnected for rotation therewith, a driving disc co-axially rotatably mounted within the hollow portion of said brake drum, friction elements intermediate said disc and said brake drum, and means for normally urging said disc against said brake drum through said friction elements for drivably connecting said disc with said brake drum, said disc being formed with an annular extension upon which said brake drum is rotatably mounted.

3. The combination according to claim 2, in which said last means comprises a pair of oppositely directed springs, one acting upon said brake drum and the other upon said disc.

4. In a vehicle, a hollow brake drum, a vehicle ground-engaging wheel rigidly interconnected for rotation therewith, a driving disc co-axially rotatably mounted within the hollow portion of said brake drum, friction elements intermediate said disc and said brake drum, and means for normally urging said disc against said brake drum through said friction elements for drivably connecting said disc with said brake drum, said last means comprising a pair of oppositely directed springs, one acting upon said brake drum and the other upon said disc, the spring acting upon said disc having a greater stiffness than that acting upon said brake drum.

5. In a vehicle having a frame, a single driving shaft transversely mounted upon said frame for relative rotation but against transverse movement thereto, a pair of wheels, one mounted for rotation on each side of the vehicle, a friction coupling connecting each wheel with said drive shaft, said coupling being releasable upon the action of centrifugal force when said vehicle follows a curved course to release the inner wheel from driving connection with said drive shaft, said wheels being each formed as a rigid extension of a hollow brake drum, and said friction couplings each including a disc mounted within the hollow portion of the respective brake drum and connected for rotation with said drive shaft, friction elements intermediate each disc and brake drum, a flanged abutment on each end of said drive shaft, first springs positioned between the frame and each disc for normally urging said discs against the respective brake drums, and second springs positioned between each abutment and the respective brake drums for normally urging said brake drums against the respective discs, said first springs having a greater stiffness than said second springs.

6. A vehicle having a frame, a single driving shaft transversely mounted upon said frame for relative rotation but against transverse movement thereto, a pair of wheels, one mounted for rotation on each side of the vehicle, and a friction coupling connecting each wheel with said drive shaft, said coupling being releasable upon the action of centrifugal force when the vehicle follows a curved course to release the inner wheel from driving connection with said drive shaft, said wheels being each formed as a rigid extension of a hollow brake drum, and said friction couplings each including a disc mounted within the hollow portion of the respective brake drum and connected for rotation with said drive shaft, friction elements intermediate each disc and brake drum, a flanged abutment on each end of said drive shaft, springs respectively positioned between the frame and each disc for normally urging said discs against the respective brake drums, and springs positioned between the respective abutments and brake drums for normally urging said brake drums against the respective discs, each disc having an annular extension for rotatably supporting said brake drum.

ERNST FITZNER.